United States Patent
Blood et al.

(10) Patent No.: US 6,874,060 B2
(45) Date of Patent: Mar. 29, 2005

(54) DISTRIBUTED COMPUTER SYSTEM INCLUDING A VIRTUAL DISK SUBSYSTEM AND METHOD FOR PROVIDING A VIRTUAL LOCAL DRIVE

(75) Inventors: Roger M. Blood, Austin, TX (US); Herbert A. Hollinger, Pflugerville, TX (US); Truc M. Nguyen, Round Rock, TX (US); Paul W. Vancil, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 10/011,093

(22) Filed: Dec. 7, 2001

(65) Prior Publication Data

US 2003/0110351 A1 Jun. 12, 2003

(51) Int. Cl.[7] .............................................. G06F 12/00
(52) U.S. Cl. .............................. 711/111; 703/21; 703/24
(58) Field of Search ........................... 711/111; 103/21, 103/24

(56) References Cited

U.S. PATENT DOCUMENTS

| | | | | |
|---|---|---|---|---|
| 5,155,845 A | | 10/1992 | Beal et al. ...................... 714/6 |
| 5,226,168 A | * | 7/1993 | Kobayashi et al. ............ 703/25 |
| 5,287,461 A | | 2/1994 | Moore ......................... 709/219 |
| 5,291,584 A | * | 3/1994 | Challa et al. .................. 703/24 |
| 5,473,765 A | * | 12/1995 | Gibbons et al. ............... 703/24 |
| 5,764,903 A | | 6/1998 | Yu .............................. 709/208 |
| 5,857,074 A | | 1/1999 | Johnson ....................... 709/217 |
| 5,884,096 A | | 3/1999 | Beasley et al. ............... 710/38 |
| 5,901,228 A | | 5/1999 | Crawford ...................... 705/34 |
| 6,029,237 A | * | 2/2000 | Beelitz ......................... 711/173 |
| 6,067,618 A | | 5/2000 | Weber ........................... 713/1 |
| 6,070,253 A | | 5/2000 | Tavallaei et al. .............. 714/31 |
| 6,081,856 A | * | 6/2000 | Comer ......................... 710/67 |
| 6,081,865 A | | 6/2000 | Tavallaei et al. ............. 710/129 |
| 6,088,816 A | | 7/2000 | Nouri et al. ................... 714/31 |
| 6,098,143 A | | 8/2000 | Humpherys et al. ......... 710/260 |
| 6,170,021 B1 | | 1/2001 | Graf ............................. 710/15 |
| 6,233,634 B1 | | 5/2001 | Clark et al. .................. 710/126 |
| 6,256,014 B1 | | 7/2001 | Thomas et al. ............. 345/163 |
| 6,304,895 B1 | | 10/2001 | Schneider et al. .......... 709/203 |
| 6,324,627 B1 | * | 11/2001 | Kricheff et al. ............. 711/163 |
| 6,367,035 B1 | | 4/2002 | White .......................... 714/40 |
| 6,574,588 B1 | * | 6/2003 | Shapiro et al. ............... 703/24 |
| 6,631,456 B2 | * | 10/2003 | Leighnor et al. ........... 711/170 |
| 6,651,093 B1 | | 11/2003 | Wiedeman et al. ......... 709/221 |
| 2003/0061401 A1 | * | 3/2003 | Luciani, Jr. .................. 709/324 |
| 2003/0065864 A1 | * | 4/2003 | Hollinger ..................... 710/305 |

FOREIGN PATENT DOCUMENTS

EP 0475639 A2 * 3/1992
JP 03-192426 A2 * 8/1991

OTHER PUBLICATIONS

Webpage for Compaq entitled "Remote Insight Lights–Out Edition" at internet <http://www.compaq.com/manage/remote–lightsout.html>, 2 pages, printed Oct. 26, 2001.

(Continued)

Primary Examiner—Christian P. Chase
(74) Attorney, Agent, or Firm—Baker Botts L.L.P.

(57) ABSTRACT

A virtual disk subsystem and method for providing a virtual local drive are disclosed. The virtual disk subsystem includes a channel bridge, such as an Advanced Technology Attachment (ATA) bridge, that receives disk commands from a disk controller, as well as a disk emulator in communication with the channel bridge and a network interface. The disk emulator includes control logic that receives disk commands from the disk controller via the channel bridge and, in response, retrieves data from a remote data storage device and forwards the data to the disk controller, such that the disk controller perceives the remote data storage device as a local device. In an exemplary embodiment, the virtual disk subsystem allows a standard operating system (OS) in a data processing system to function as if the data processing system included the emulated drive.

20 Claims, 4 Drawing Sheets

OTHER PUBLICATIONS

Webpage for Compaq entitled "Virtual Floppy Drive" at internet <http://www.compaq.com/manage/remote–lightsout–newvirtdrive.html>, 2 pages, printed Oct. 27, 2001.

Webpage for Compaq entitled "Remote Insight Lights–Out Edition vs. Remote Insight Board/PCI" at internet <http://www.compaq.com/manage/lightsout _vs_board.html>, 3 pages.

Webpage for Compaq entitled "Remote Insight, Lights–Out Edition; Enabling Virtual Presence" at internet <http://www.compaq.com/manage/remote–lightsout.html>, 3 pages, plus 11 subpages from hyperlink on webpage.

Webpage for Compaq entitled "Remote Insight, Lights–Out Edition; Product Description" at internet <http://www.compaq.com/manage/remote–lightsout–pd.html>, 6 pages.

* cited by examiner

|  | SW0 | SW1 | CS0 | CS1 |
|---|---|---|---|---|
| LD0 Master<br>LD1 Slave | A | A | Closed | Open |
| VD0 Master<br>LD0 Slave | A | B | Open | Don't Care |
| LD0 Master<br>VD0 Slave | A | B | Closed | Don't Care |
| LD0 Master<br>VD1 Slave | B | Don't Care | Don't Care | Don't Care |

DISTRIBUTED COMPUTER SYSTEM INCLUDING A VIRTUAL DISK SUBSYSTEM AND METHOD FOR PROVIDING A VIRTUAL LOCAL DRIVE

CROSS-REFERENCE TO RELATED APPLICATIONS

This application is related to copending U.S. Pat. application Ser. No. 09/970,229, entitled "System and Method Supporting Remote Data Processing System Management," filed Oct. 3, 2001, naming as inventor Herbert A. Hollinger, and DC-02894 (hereinafter the Related Application). The Related Application is hereby incorporated herein by reference.

TECHNICAL FIELD

The present disclosure relates in general to data processing systems. In particular, the present disclosure relates to technology that provides servers, server blades, and other data processing systems with virtual local data storage, such as a virtual compact disc (CD) drive, a virtual digital versatile disc (DVD) drive, a virtual hard disk drive, and/or a virtual floppy disk drive.

BACKGROUND

A typical conventional data processing system includes at least one hard disk drive, one or more central processing units (CPUs), random access memory (RAM), non-volatile solid-state memory such us electrically erasable programmable read only memory (known specifically as EEPROM or, more generally, as ROM), and a backplane that interconnects the above components. When the data processing system is started, the CPU first loads and executes boot code from the ROM. Then, the CPU loads an operating system (OS) from the hard drive into the RAM and begins executing the OS. One or more applications (e.g., a web browser or web server application) may then be copied from the hard drive to the RAM and executed.

However, it is sometimes necessary to alter the normal boot process. For example, some applications for testing and administering computers must be executed before an OS has been loaded. To provide for such circumstances, data processing systems typically also include a floppy disk drive, and instructions from a floppy disk in the floppy drive may be executed instead of loading an OS from the hard drive. The operation of starting from the floppy drive instead of starting from a hard drive is known as "booting from floppy."

One disadvantage of the above-described architecture, however, is the expense associated with providing the data processing system with both a floppy drive and a hard drive. Another disadvantage is the physical inconvenience associated with using the floppy drive on the data processing system to alter the boot process. For example, when managing servers and other data processing systems in a network that spans great distances, it is inconvenient to travel to the site of each server whenever it becomes necessary to use the alternate boot process for that server.

Furthermore, it is sometimes desirable to minimize the space occupied by a data processing system. For example, when grouping server data processing systems together in server racks, reducing the size of each server makes it possible to increase the number of servers per rack.

Therefore, as recognized by the present invention, conventional data processing systems could benefit from a number of improvements. For instance, it would be helpful to provide a data processing system that could be booted in an alternate boot sequence without requiring an individual to be physically present at the site of that data processing system. Also, it would be beneficial to provide a data processing system without a hard drive that could boot and execute applications that currently require hard drives. It would also be helpful to provide a data processing system that retains most or all of the functionality of a conventional data processing system, despite the absence of a hard drive, an optical disk drive, and/or a floppy drive. It would be even more beneficial if the above capabilities could be provided without requiring any change to existing software, such as OS and Basic Input and Output System (BIOS) software.

SUMMARY

The present disclosure relates to a virtual disk subsystem for a data processing system with a disk controller and a network interface in communication with a remote data storage device. The virtual disk subsystem includes a channel bridge, such as an AT Attachment or Advanced Technology Attachment (ATA) bridge, that receives disk commands from the disk controller. The virtual disk subsystem also includes a disk emulator in communication with the ATA bridge and the network interface. The disk emulator includes control logic that receives one or more disk commands from the disk controller via the channel bridge and, in response, retrieves data from the remote data storage device and forwards the data to the disk controller, in such a manner that the disk controller perceives the remote data storage device as a local device. The virtual disk subsystem thus emulates a local disk drive.

In an exemplary embodiment, the virtual disk subsystem allows a standard BIOS and a standard OS in the data processing system to function as if the data processing system included the emulated local disk drive.

BRIEF DESCRIPTION OF THE DRAWINGS

The present disclosure and its numerous objects, features, and advantages may be better understood by reference to the following description of an exemplary embodiment and the accompanying drawings, in which.

DETAILED DESCRIPTION

Figure 1:
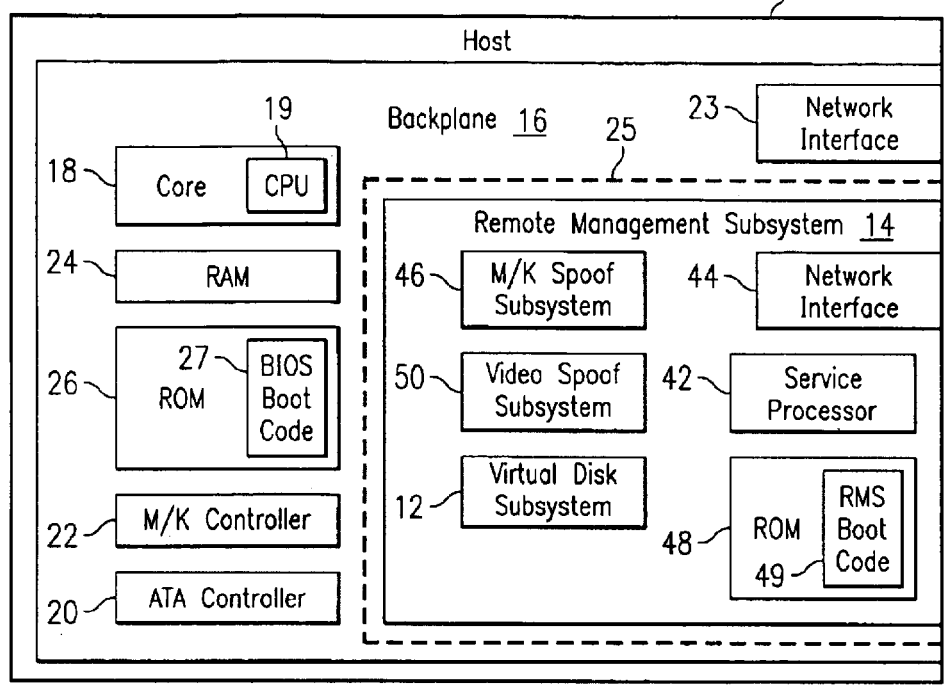
FIG. 1 presents a block diagram of an exemplary embodiment of a data processing system with a virtual disk subsystem.

The block diagram of FIG. 1 depicts an exemplary data processing system 10 with an exemplary virtual disk subsystem 12 according to the present invention. In the exemplary embodiment, virtual disk subsystem 12 is implemented as part of a remote management subsystem (RMS) 14. RMS 14 may be embedded on a backplane or motherboard 16 in data processing system 10 with numerous other components, such as a processing core 18 with one or more central processing units (CPUs) 19. Alternatively, RMS 14 may be implemented on adapter card 25. Motherboard 16 also includes a disk controller 20, a mouse/keyboard (M/K)

controller 22, a network interface 23, and storage media such as random access memory (RAM) 24 and ROM 26. ROM 26 contains BIOS boot code 27. In the exemplary embodiment, disk controller 20 is an ATA controller 20, such as an 82801 I/O Controller Hub (ICH) from INTEL Corporation.

RMS 14 includes a service processor (SP) 42 and ROM 48. ROM 48 contains RMS boot code 49, which includes initialization instructions and system management instructions to be executed by SP 42. RMS 14 also includes a network interface 44, as well as an M/K spoof subsystem 46 and a video spoof subsystem 50, such as those described in the Related Application, which provide for remote input and output for remote management of data processing system 10.

Figure 2:
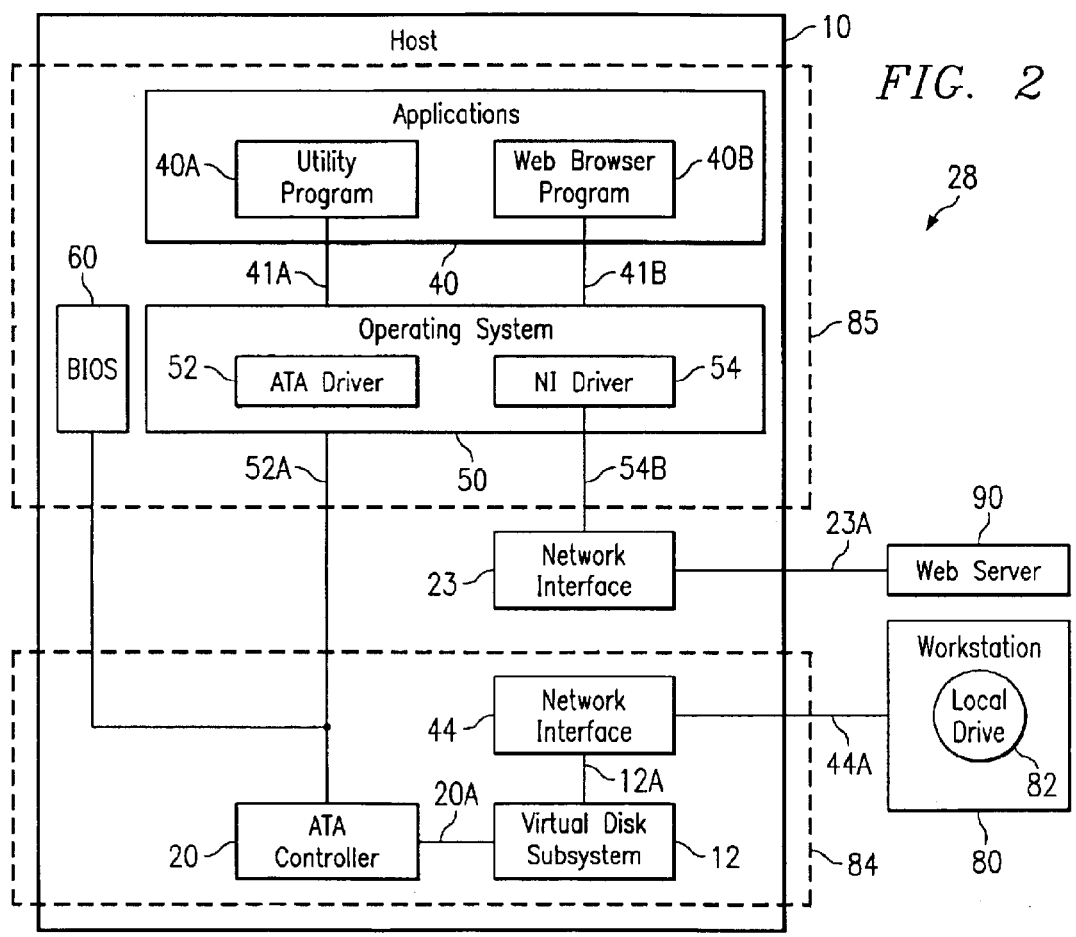
FIG. 2 presents a high level block diagram of an exemplary distributed data processing system using a virtual disk subsystem according to FIG. 1.

Referring now to FIG. 2, data processing system 10 is illustrated as part of a computer network 28. RMS 14 facilitates management of data processing system 10 from remote workstations, such as workstation 80. Data processing system 10 communicates with workstation 80 via network interface 44. Data processing system 10 may also communicate with other systems, such as a remote web server 90, via network interface 23. Computer network 28 may also be referred to as a distributed computing system 28, and distributed computing system 28 may include additional data processing systems.

Figure 3:
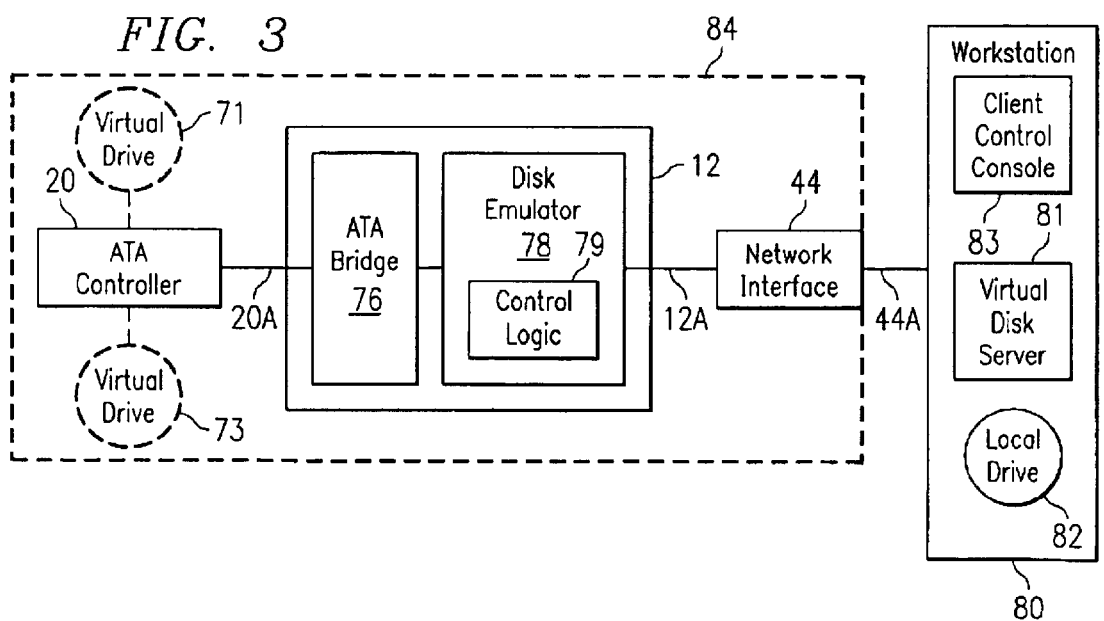
FIG. 3 presents a more detailed block diagram of the virtual disk subsystem of FIG. 2 with related components.

With reference now to FIG. 3, the hardware components 84 relating to disk access are shown in greater detail. Specifically, in the exemplary embodiment, virtual disk subsystem 12 includes an ATA bridge 76 and a disk emulator 78. ATA bridge 76 receives disk commands from ATA controller 20 via a standard Integrated Drive Electronics (IDE) bus 20A and operates as an interface between disk emulator 78 and the physical IDE bus 20A from ATA controller 20. For instance, to provide a virtual local CD-ROM drive, ATA bridge 76 may include a conventional CD-ROM decoder. Alternatively, ATA bridge 76 may be implemented as software instructions, hardware such as field-programmable gate arrays (FPGAs), or a combination of software and hardware. The disk commands may include commands from ATA and Small Computer System Interface (SCSI) command sets such as Advanced Technology Attachment (ATA)/ATA Packet Interface—5 (ATAPI—5), Multi-Media Commands—2 (MMC—2), etc. ATA bridge 76 passes the disk commands to disk emulator 78 for redirection to workstation 80.

In the exemplary embodiment, disk emulator 78 is implemented as software that executes on SP 42. That software includes control logic 79 for communicating with ATA bridge 76, redirecting ATA commands, and emulating local drives. If data processing system 10 is not connected to workstation 80, disk emulator 78 nevertheless emulates local devices for purposes of operations such as boating data processing system 10. When workstation 80 is present, disk emulator 78 serves as an I/O proxy to workstation 80 over an Ethernet network represented by path 44A.

For example, disk emulator 78 typically responds to disk commands by using path 12A, network interface 44, and Ethernet network 44A to forward those commands to workstation 80. The native software in workstation 80 includes a client control console 83 which provides a user interface for managing remote systems such as data processing system 10. The native software also includes a virtual disk server 81 (which may or may not be implemented as part of client control console 83) for supporting virtual drives. Virtual disk server 81 receives the commands from disk emulator 78, local drive 82 such as an optical disk drive, a floppy drive, or a hard drive as appropriate, and returns the data from the local drive in raw format to disk emulator 78. The disk commands from ATA controller 20 are thus processed to access a disk in workstation 80.

Disk emulator 78 then forwards the disk data to ATA bridge 76, which forwards the disk data to ATA controller 20. Virtual disk subsystem 12 thus fools ATA controller 20 into operating as if a local disk drive were connected to ATA controller 20, even if no disk drive is present locally. If workstation 80 is not attached and virtual disk subsystem 12 is configured to provide a virtual drive for removable media such as CDs, virtual disk subsystem 12 interacts with ATA controller 20 as if the virtual drive does not contain a removable media (e.g., a CD).

In the exemplary embodiment, data processing system 10 does not actually contain any local disk drives, but virtual disk subsystem 12 may be configured to provide a virtual local floppy disk drive 71, a virtual local CD drive, and/or a virtual local hard disk drive 73 for data processing system 10, both during and after the BIOS boot process. For example, virtual disk subsystem 12 may provide a virtual 1.44 MB floppy drive by emulating an LS-120 floppy drive. Virtual local drives may also be referred to as emulated local disk drives or simply as virtual drives.

Figure 4:
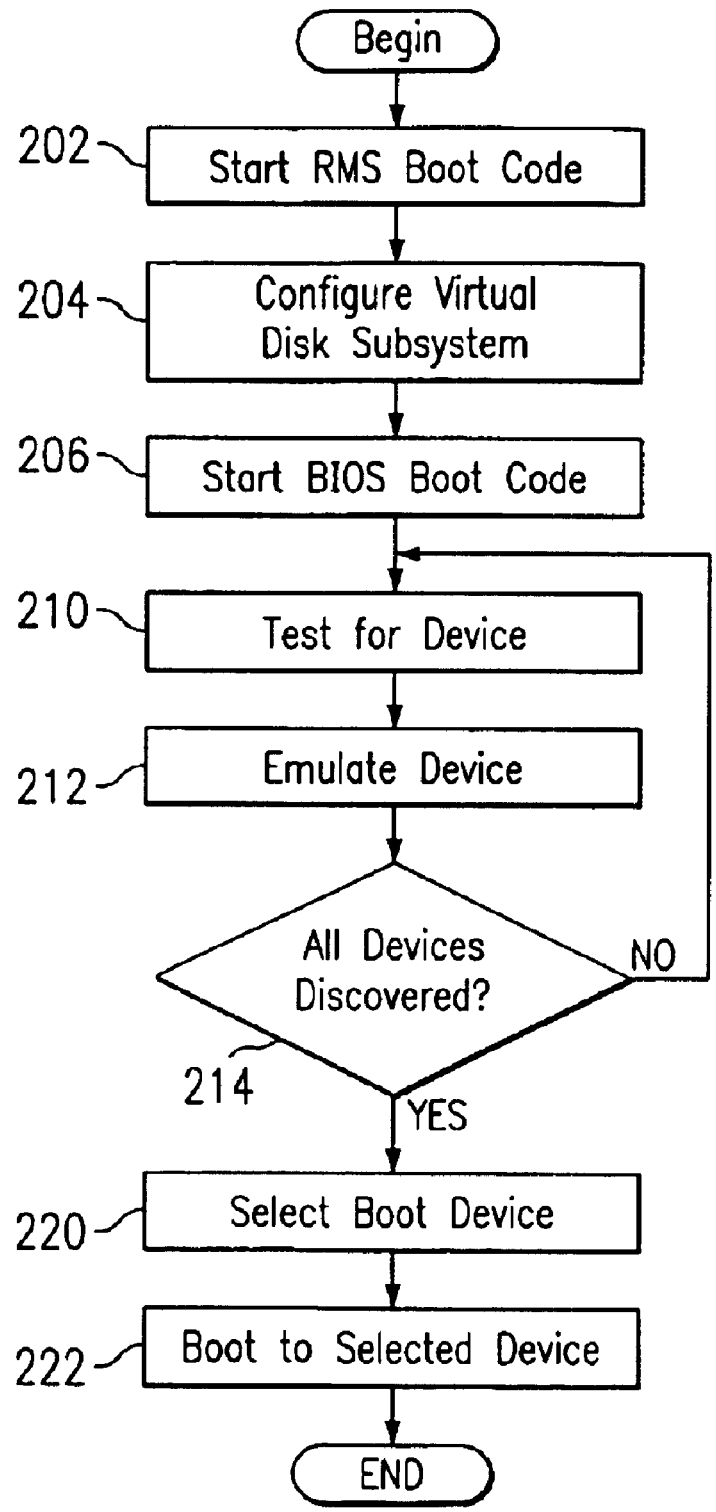
FIG. 4 is a flowchart of an exemplary process for using the virtual disk subsystem of FIG. 3 to emulate local disk drives.

Referring now to FIG. 4 an exemplary process for providing virtual drives begins with data processing system 10 initiating a boot process, for example as a result of being started or rebooted, either locally or remotely. As shown at block 202, the boot process begins with SP 42 (FIG. 1) initiating execution of RMS boot code 49 from ROM 48. RMS boot code 49 includes instructions for configuring virtual disk subsystem 12 according to parameters stored in ROM 48, parameters obtained from a remote data processing system such as workstation 80, and/or hardware settings in virtual disk subsystem 12. As indicated at block 204, SP 42 then configures virtual disk subsystem 12 accordingly. For example, virtual disk subsystem 12 maybe configured to emulate an LS-120 drive, a local hard disk, a local CD-ROM drive, other types of local disk drives, or any combination of two or more local disk drives.

In the exemplary process, RMS boot code 49 configures virtual disk subsystem 12 to emulate floppy disk drive 71 and hard disk drive 73. The configuration parameters further specify hard disk operating parameters (e.g., capacity for the virtual hard disk). As depicted at block 206, once RMS boot code 49 has finished executing, processing core 18 begins executing BIOS boot code 27 by loading boot instructions from ROM 26 into RAM 24 and executing those boot instructions. BIOS boot code 27 includes instructions for discovering the installed hardware in data processing system 10.

For instance, as indicated at block 210, BIOS boot code 27 tests for the presence of disk drives by sending one or more disk commands to ATA controller 20. In response, ATA controller 20 communicates with virtual disk subsystem 12, and, in the exemplary process, virtual disk subsystem 12 emulates floppy disk drive 71 for ATA controller 20, as indicated at block 212. As shown at block 214, BIOS boot code 27 then determines whether all devices have been discovered. If BIOS boot code 27 has not attempted to discover devices on all channels yet, the process returns to block 210, and BIOS boot code 27 tests for additional drives. For example, BIOS boot code 27 may then test for the presence of a disk drive on another channel by sending one or more additional disk commands to ATA controller 20. In response, ATA controller 20 communicates with virtual disk subsystem 12, and, in the exemplary process, virtual disk subsystem 12 emulates hard disk drive 73 for ATA controller 20, as shown at block 212. The test and emulation operations continue until BIOS boot code 27 has discovered all devices.

As mentioned above, in the exemplary embodiment, virtual disk subsystem 12 is configured to emulate a local floppy disk and a local hard disk. In alternative embodiments, virtual disk subsystem 12 may be configured to emulate other local devices, such as a local floppy disk and a local CD drive.

As shown at blocks 220 and 222, after discovering the actual and virtual disk drives in data processing system 10, BIOS boot code 27 then selects a boot device and boots to that device. For instance, for devices with removable media, BIOS boot code 27 determines whether the device includes a removable media. For virtual devices with removable media, if workstation 80 is not attached to data processing system 10, virtual disk subsystem 12 advises ATA controller 20 that the virtual device (e.g., a virtual floppy drive or a virtual CD drive) contains no media.

In addition, virtual disk server 81 may be configured to pass commands through to the same type of device as expected or to redirect commands to alternative device types. For example, when data processing system 10 tries to read from a virtual CD drive, virtual disk server 81 may redirect those requests to a file on a local hard drive. When configured for direct pass through, if the floppy drive, for example, in workstation 20 does not contain a floppy disk, virtual disk subsystem 12 will advise BIOS boot code 27 that virtual floppy drive 71 does not contain a floppy disk.

On the other hand, if virtual disk server 81 is configured to redirect floppy commands to a hard drive or if workstation 80 contains a floppy disk in the floppy drive, data processing system 10 will boot to virtual floppy disk 71. Actually, however, virtual disk subsystem 12 will retrieve the data from workstation 80 and forward that data to ATA controller 20 as if the data has been read from a local floppy disk. For example, the data may include instructions to load a small OS 50 (such as MICROSOFT® disk operating system (DOS) (MS-DOS)) and a utility program 40A from the floppy disk into RAM 24 and execute that program. In such a case, virtual disk subsystem 12 will retrieve OS 50 and utility program 40A from workstation 80 and forward that data to ATA controller 20 as if the data had been retrieved from a local floppy disk.

Alternatively, if virtual disk subsystem 12 has advised BIOS boot code 27 that virtual floppy drive 71 does not hold a floppy disk, BIOS boot code 27 will instead boot to an alternative boot device, such as virtual hard drive 73. For example, BIOS boot code 27 may load a large OS 50 (such as MICROSOFT WINDOWS NT®) from virtual hard drive 73 into RAM 24. Actually, however, virtual disk subsystem 12 will retrieve that data from workstation 80. Data processing system will then continue to operate as if virtual local floppy disk drive 71 and virtual local hard disk drive 73 were actual local disk drives.

Figures 5, 6:
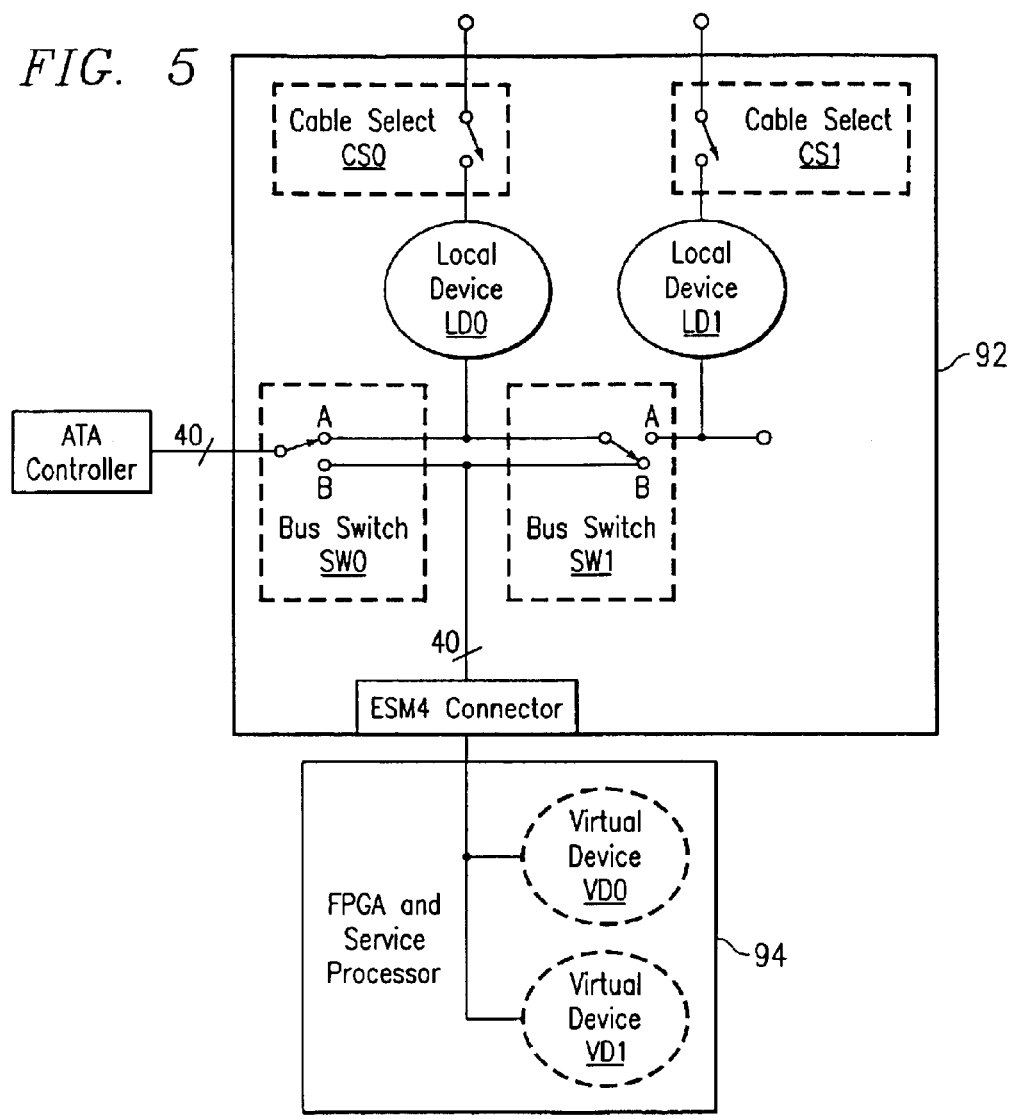
FIG. 5 presents a block diagram of exemplary circuitry for supporting various combinations of local and virtual disks in a host system.
FIG. 6 presents a table of settings to configure the circuitry of FIG. 5 for various combinations of local and virtual disks.

With reference now to FIG. 5, in alternative embodiments for hosts which include local drives, the virtual disk subsystem allows the local drives to be used together with virtual drives. For instance, FIG. 5 depicts an alternative embodiment that includes a local device LD0 and a local device LD1, as well as control logic in a virtual disk subsystem for replacing one or both of the local devices with virtual devices VD0 and/or VD1. As illustrated, the virtual disk subsystem includes an ATA bridge 92 and a disk emulator 94. In the illustrated embodiment, ATA bridge 92 is implemented at least partially as hardware circuitry, and disk emulator 94 is implemented as various sets of control logic, including instructions executing in a service processor and control logic within an FPGA.

To configure the system to use various combinations of local drives and/or virtual drives, various switches are set according to predetermined patterns before the host is booted, as illustrated in the table of FIG. 6. For instance, to configure the system to use local device LD0 as the master drive and local device LD1 as the slave drive, bus switches SW0 and SW1 are set to A, cable select switch CS0 is closed, and cable select switch CS1 is opened. Cable select switches CS0 and CS1 may also be referred to as "cable select" and "cable select not," respectively. To configure the system to use virtual device VD0 as the master drive and local device LD0 as the slave drive, bus switch SW0 is set to A, bus switch SW1 is set to B, and cable select switch CS0 is opened. The position of CS1 is not significant. As illustrated, different settings can be used to configure local device LD0 as master and virtual device VD0 as slave or to configure virtual devices VD0 and VD1 as master and slave, respectively. The selected drive configuration will persist until the host is rebooted with different settings. The characteristics of virtual devices VD0 and VD1 are configured by the control logic in the FPGA.

Circuitry for a single IDE channel with support for only two devices is depicted in FIG. 5. Preferably, no local device is connected on that channel if the circuitry is configured to provide two virtual devices. However, as will be readily apparent to those with ordinary skill in the art, a virtual disk subsystem may be implemented on both primary and secondary IDE channels. Furthermore, although the channel bridge in virtual disk subsystem 12 is an ATA bridge, alternative embodiments include virtual disk subsystems with other types of channel bridges. For example, an alternative virtual disk subsystem for communicating with a SCSI disk controller may include a SCSI bridge.

In the exemplary embodiment, since virtual disk subsystem 12 interacts with the ATA controller in the manner described above, software executing in the data processing system needs no changes to utilize the virtual local disk drives. For example, as shown in FIG. 2, the software 85 in data processing system 10 includes BIOS 60, OS 50, and applications 40, each of which was originally designed for use in systems with actual local disk drives. Virtual disk subsystem 12 nevertheless allows each of those software components to execute without any modification in data processing system 10.

For example, when utility program 40A executes an operation requiring disk access, such as a READ operation, a READ request is submitted to OS 50, as depicted by path 41A. In response, an ATA driver 52 in OS 50 accesses ATA controller 20, as indicated by path 52A. The communications from OS 50 cause ATA controller 20 to send one or more disk commands to virtual disk subsystem 12, as depicted by path 20A. The above operations are basically standard operations, requiring no modifications to the software components. However, in response to the disk commands from ATA controller 20, virtual disk subsystem 12 automatically uses network interface 44 to retrieve the desired data from workstation 80 and then returns the desired data to ATA controller 20, as described above.

In addition, data processing system 10 also supports explicit requests for data from remote systems, such as requests from a web browser program 40B for data from remote web server 90. For example, as depicted by path 41B, when web browser program 40B attempts to retrieve data from web server 90 (or any remote system in network 28), web browser program 40B sends a request to OS 50. As depicted by paths 54B and 23A, in response to the request, a network interface driver 54 in OS 50 uses network interface 23 to retrieve the requested data from web server 90.

Among the benefits of the virtual disk subsystem is that it enables a data processing system to execute software that normally would require a local disk drive. The need for local disk drives is therefore eliminated. In addition, remote administration of the data processing system is facilitated, in that the data processing system can be configured to retrieve software such as an operating system and/or an application for testing the data processing system from a remote data source. For instance, the virtual disk subsystem permits the data processing system to boot from a virtual floppy disk. Furthermore, the remote management subsystem may fully support pre-OS virtual drives and pre-OS remote management. That is, full remote management capabilities may be provided whether or not the server has booted to the OS. Accordingly, the virtual disk subsystem provides full functionality regardless of the type of OS or BIOS to be used by the server. Moreover, the BIOS and OS require no modifications or extra drivers to use the virtual drives.

Additionally, the virtual disk subsystem 12 makes it possible for multiple data processing systems to share a single system file or other data object. For example, multiple systems could use the same boot instructions from a single floppy disk in a workstation. Maintenance and modification of shared data is therefore greatly simplified. For instance, to upgrade software on virtual hard drives for multiple data processing systems, it may only be necessary to upgrade the software on the workstation, rather than upgrading the software on a hard disk for each data processing system.

Although the present invention has been described with reference to an exemplary embodiment, those with ordinary skill in the art will understand that numerous variations of the exemplary embodiment could be practiced without departing from the scope of the present disclosure. For instance, the exemplary embodiment redirects disk commands to a remote disk drive, but in alternative embodiments, the virtual disk subsystem may redirect disk commands to a different type of storage media within the data processing system. For example, the data processing system might "think" it is booting from floppy, but the virtual disk subsystem 12 could actually retrieve the boot data from local storage such as ROM or RAM.

Furthermore, the modules and components depicted within the server in the exemplary embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. For example, the control logic in the disk emulator may be implemented as software instructions, hardware such as FPGAS, or a combination of software and hardware.

It should also be understood that the teachings of the present disclosure could be used to advantage in a wide variety of information handling systems, with the illustrated data processing systems used herein as representatives of such systems. Such information handling systems may include any instrumentality or aggregate of instrumentalities primarily designed to compute, classify, process, transmit, receive, retrieve, originate, switch, store, display, manifest, detect, record, reproduce, handle, or utilize any form of information, intelligence, or data for business, scientific, control, or other purposes.

The present invention therefore is not limited to the specifically disclosed embodiments but is defined by the following claims.

What is claimed is:

1. A method for providing a virtual local disk drive for a data processing system with a disk controller, a virtual disk subsystem, and a network interface for communicating with remote devices, the method comprising:
    receiving a disk command from the disk controller at a channel bridge of the virtual disk subsystem;
    in response to the disk command, obtaining data from a remote data storage device via the network interface; and
    forwarding the data from the virtual disk subsystem to the disk controller via the channel bridge, such that the disk controller perceives the remote data storage device as a local device.

2. The method of claim 1, wherein:
    the channel bridge comprises an Advanced Technology Attachment (ATA) bridge; and
    the operation of receiving the disk command at the channel bridge comprises receiving the disk command at the ATA bridge.

3. The method of claim 1, wherein:
    the channel bridge comprises a Small Computer System Interface (SCSI) bridge; and
    the operation of receiving the disk command at the channel bridge comprises receiving the disk command at the SCSI bridge.

4. The method of claim 1, wherein:
    the disk command comprises a command for a local floppy disk drive; and
    the operation of forwarding the data from the virtual disk subsystem to the disk controller comprises emulating the local floppy disk drive.

5. The method of claim 1, wherein:
    the disk command comprises a command for a local hard disk drive; and
    the operation of forwarding the data from the virtual disk subsystem to the disk controller comprises emulating the local hard disk drive.

6. The method of claim 1, wherein:
    the disk command comprises a command for a local optical disk drive; and
    the operation of forwarding the data from the virtual disk subsystem to the disk controller comprises emulating the local optical disk drive.

7. The method of claim 1, wherein:
    the operation of obtaining data from the remote data storage device comprises obtaining an operating system (OS) from the remote data storage device; and
    the method further comprises using the OS to boot the data processing system.

8. The method of claim 1, wherein:
    the operation of obtaining data from the remote data storage device comprises obtaining a diagnostic application from the remote data storage device; and
    the method further comprises executing the diagnostic application.

9. The method of claim 1, further comprising:
    configuring the virtual disk subsystem to provide access to at least one local disk drive and at least one virtual local disk drive.

10. A virtual disk subsystem for a data processing system with a disk controller and a network interface in communication with a remote data storage device, the virtual disk subsystem comprising:
    a channel bridge that receives disk commands from the disk controller;
    a disk emulator in communication with the channel bridge and the network interface; and
    control logic in the disk emulator that receives at least one of the disk commands from the disk controller via the channel bridge and, in response, retrieves data from the remote data storage device and forwards the data to the disk controller via the channel bridge, such that the disk controller perceives the remote data storage device as a local device.

11. The virtual disk subsystem of claim 10, wherein:
    the at least one of the disk commands comprises a command for a local floppy disk drive; and the control logic in the disk emulator emulates the local floppy disk drive in response to the command for the local floppy disk drive.

12. The virtual disk subsystem of claim 10, wherein:
the at least one of the disk commands comprises a command for a local hard disk drive; and
the control logic in the disk emulator emulates the local hard disk drive in response to the command for the local hard disk drive.

13. The virtual disk subsystem of claim 10, wherein:
the at least one of the disk commands comprises a command for a local optical disk drive; and
the control logic in the disk emulator emulates the local optical disk drive in response to the command for the local optical disk drive.

14. The virtual disk subsystem of claim 10, wherein:
the data retrieved from the remote data storage device comprises an operating system (OS); and
the data processing system uses the OS to boot.

15. An information handling system-having a network interface and a virtual disk subsystem, the information handling system comprising:
the virtual disk subsystem including:
a channel bridge that receives disk commands from a disk controller;
a disk emulator in communication with the channel bridge and the network interface; and
control logic in the disk emulator that receives at least one of the disk commands from the disk controller via the channel bridge and, in response, retrieves data from a remote data storage device and forwards the data to the disk controller via the channel bridge, such that the disk controller perceives the remote data storage device as a local disk device;
memory containing an operating system; and
a processor in communication with the memory, the network interface, and the virtual disk subsystem, wherein:
the processor executes the operating system; and
the virtual disk subsystem allows the operating system to function as if the remote data storage device were the local disk drive.

16. The information handling system of claim 15, further comprising:
an embedded remote management subsystem that includes the virtual disk subsystem; and
a motherboard that includes the processor and the embedded remote management subsystem.

17. The information handling system of claim 15, further comprising:
a motherboard that includes the processor;
an adapter card in communication with the motherboard; and
a remote management subsystem on the adapter card, wherein the remote management subsystem includes the virtual disk subsystem.

18. An information handling system with a network interface and a virtual disk subsystem, the information handling system further comprising:

the virtual disk subsystem including:
a channel bridge that receives disk commands from a disk controller;
a disk emulator in communication with the channel bridge and the network interface; and
control logic in the disk emulator that receives at least one of the disk commands from the disk controller via the channel bridge and, in response, retrieves data from a remote data storage device and forwards the data to the disk controller via the channel bridge, such that the disk controller perceives the remote data storage device as a local device;
memory containing a Basic Input and Output System (BIOS); and
a processor in communication with the memory, the network interface, and the virtual disk subsystem, wherein:
the processor executes the BIOS; and
the virtual disk subsystem allows the BIOS to function as if the information handling system included the remote data storage device.

19. A distributed computing system for remotely managing a data processing system, the distributed computing system comprising:
a first data processing system with a disk controller;
a second data processing system in communication with the first data processing system, wherein the second data processing system includes a data storage device; and
a virtual disk subsystem in the first data processing system in communication with the disk controller and the second data processing system, wherein:
the virtual disk subsystem receives disk commands for a local disk drive from the disk controller; and
the virtual disk subsystem returns data from the data storage device in the second data processing system to the disk controller in response to the disk commands.

20. A data processing system, comprising:
a processor;
a disk controller;
a virtual disk subsystem;
a network interface for communicating with remote devices;
one or more communications paths connecting the processor, the disk controller, the virtual disk subsystem, and the network interface;
a channel bridge in the virtual disk subsystem that receives a disk command from the disk controller;
a disk emulator in the virtual disk subsystem that receives the disk command from the channel bridge and, in response, obtains data from a remote data storage device via the network interface and forwards the data to the disk controller to provide the disk controller with a virtual local disk drive; and
circuitry in the channel bridge that allows a user to select from different virtual disk drive configurations.

* * * * *